United States Patent
Li et al.

(10) Patent No.: US 7,162,994 B2
(45) Date of Patent: Jan. 16, 2007

(54) CONTROL METHOD AND APPARATUS FOR GASEOUS FUELLED INTERNAL COMBUSTION ENGINE

(75) Inventors: Guowei Li, Vancouver (CA); Olivier Lebastard, Burnaby (CA)

(73) Assignee: Westport Power Inc., Vancouver (CA)

( * ) Notice: Subject to any disclaimer, the term of this patent is extended or adjusted under 35 U.S.C. 154(b) by 0 days.

(21) Appl. No.: 11/098,238

(22) Filed: Apr. 4, 2005

(65) Prior Publication Data

US 2005/0257769 A1 Nov. 24, 2005

Related U.S. Application Data

(63) Continuation of application No. PCT/CA2003/001463, filed on Oct. 2, 2003.

(30) Foreign Application Priority Data

Oct. 2, 2002 (CA) ................................. 2406137

(51) Int. Cl.
 *F02B 3/00* (2006.01)
 *F02B 3/10* (2006.01)
(52) U.S. Cl. ...................... 123/299; 123/295
(58) Field of Classification Search ................ 123/299, 123/300, 305, 295, 260, 275, 276, 298
See application file for complete search history.

(56) References Cited

U.S. PATENT DOCUMENTS 3,469,564 A * 9/1969 Hiereth ........................ 123/276
4,134,034 A    1/1979 Dardai et al.
4,556,020 A   12/1985 Hickling
4,738,227 A *  4/1988 Kamo et al. ................. 123/23
4,787,349 A * 11/1988 Hilger ......................... 123/297

(Continued)

FOREIGN PATENT DOCUMENTS

EP          0643209           3/1995

(Continued)

OTHER PUBLICATIONS

Johansson, Christensen, et al.; "Supercharged Homogeneous Charge Compression Ignition"; SAE Technical Paper Series; Feb. 23, 1993; Paper No. 980787 (Reprinted from Combustion Processes in Diesel Engines (SP-1328)); Warrenville, PA.

(Continued)

*Primary Examiner*—Mahmoud Gimie
(74) *Attorney, Agent, or Firm*—McAndrews, Held & Malloy, Ltd.

(57) ABSTRACT

A method and apparatus create an environment within a combustion chamber of an internal combustion engine suitable for auto-ignition and combustion of a fuel that will not otherwise auto-ignite. Under high-load conditions, a pilot quantity of the fuel is injected in the combustion chamber of an internal combustion engine during the compression stroke of the piston. The quantity and timing of the fuel are chosen to heat an intake charge within the combustion chamber to a temperature at or above the auto-ignition temperature of the fuel by the time required for a main injection of the fuel to drive the piston during the power stroke. Generally, auto-ignition temperatures should be reached at or near top dead center of the piston. An injector design delivers fuel in manner carried out by the method.

25 Claims, 12 Drawing Sheets

U.S. PATENT DOCUMENTS

| | | | |
|---|---|---|---|
| 4,838,213 A | | 6/1989 | Gerace |
| 4,896,636 A | * | 1/1990 | Pfefferle ................. 123/145 A |
| 4,966,103 A | | 10/1990 | Schaub et al. |
| 4,969,432 A | | 11/1990 | Scharnweber et al. |
| 5,117,801 A | | 6/1992 | Schaub et al. |
| 5,144,924 A | | 9/1992 | Paro |
| 5,146,881 A | * | 9/1992 | Pfefferle ................. 123/145 A |
| 5,522,357 A | * | 6/1996 | Nogi et al. ................. 123/261 |
| 5,756,924 A | | 5/1998 | Early |
| 5,769,621 A | | 6/1998 | Early et al. |
| 6,298,825 B1 | | 10/2001 | Hupperich et al. |
| 6,305,929 B1 | | 10/2001 | Chung et al. |
| 6,691,671 B1 | * | 2/2004 | Duffy et al. ................. 123/299 |
| 6,814,032 B1 | * | 11/2004 | Goto ..................... 123/27 GE |
| 6,990,946 B1 | * | 1/2006 | Goto ......................... 123/275 |
| 2004/0069267 A1 | * | 4/2004 | Hilger et al. ............... 123/260 |
| 2004/0118557 A1 | * | 6/2004 | Ancimer et al. ............ 166/227 |

FOREIGN PATENT DOCUMENTS

| | | |
|---|---|---|
| JP | 2000008960 | 1/2000 |
| JP | 2002-221037 | 8/2002 |
| WO | WO 97/10428 | 3/1997 |
| WO | WO 01/59280 | 8/2001 |
| WO | WO 01/59285 | 8/2001 |

OTHER PUBLICATIONS

Willi, M.L., et al.; "Ignition-Assisted, Natural Gas Engine"; Journal of Engineering for Gas Turbines and Power; Oct. 1995; pp. 799-802; vol. 117.

Fraser, Roydon, et al.; "Autoignition of Methane and Natural Gas in a Simulated Diesel Environment"; SAE Technical Paper No. 910227; undated.

Naber, Jeffrey, et al.; "Diesel Conditions: Experiments and Chemical Kinetic Modeling"; SAE Technical Paper No. 942034; undated.

* cited by examiner

CONTROL METHOD AND APPARATUS FOR GASEOUS FUELLED INTERNAL COMBUSTION ENGINE

CROSS-REFERENCE TO RELATED APPLICATION(S)

This application is a continuation of International Application No. PCT/CA2003/001463, having an international filing date of Oct. 2, 2003, entitled "Control Method and Apparatus for Gaseous Fuelled Internal Combustion Engine". International Application No. PCT/CA2003/001463 claimed priority benefits, in turn, from Canadian Patent Application No. 2,406,137 filed Oct. 2, 2002. International Application No. PCT/CA2003/001463 is also hereby incorporated by reference herein in its entirety.

FIELD OF THE INVENTION

The present invention relates to a method and apparatus for creating a combustion event within the combustion chamber of a direct injection internal combustion engine.

BACKGROUND OF THE INVENTION

There are emissions benefits of operating diesel engines using natural gas. Natural gas, by way of example, is a clean burning fuel (relative to diesel). Specifically, natural gas, in general, allows engines to operate with reduced emission levels of particulate matter (PM), hydrocarbons, greenhouse gases and nitrogen oxides (NOx).

Additionally, replacing conventional fuels with natural gas, which is a relatively abundant and broadly available fuel, helps to reduce dependence on oil.

In this disclosure the invention will be described in relation to natural gas fuelled engines. However, other gaseous fuels may be substituted with similar benefits. By way of example, gaseous fuels such as methane, ethane, propane and lighter flammable hydrocarbon derivatives, as well as hydrogen and hythane™ (a mix of natural gas and hydrogen) and other such gaseous fuels may also be used with the invention.

Recent developments in natural gas fuelled engine technology has shown that natural gas injected into a combustion chamber at high pressure can result in engine performance that is similar to diesel engine performance. Such a high pressure direct injection technology being developed by the Applicant is known as HPDI™ technology, which provides a solution to emissions levels associated with diesel-fuelled engines while incurring little or no penalty in regards to diesel fuelled engine performance.

Natural gas using current diesel engine technology, requires an ignition assist strategy. Unlike diesel fuel, natural gas does not auto-ignite quickly when injected into the combustion chamber environment established in a typical operating diesel engine. Therefore, in order to ensure timely ignition and combustion of natural gas in such engines, an ignition assist is provided. For the purposes of this disclosure, the auto-ignition temperature of a fuel is the temperature of the intake charge within the combustion chamber that will cause auto-ignition and combustion of that fuel. Auto-ignition should occur within a time period after directly injecting the fuel that is suitable to provide the required energy to the pistons. For clarity, ignition assist strategies are needed for the other gaseous fuels noted above as well as some liquid fuels such as methanol and other fuels that have relatively high auto-ignition temperatures.

One such ignition assist strategy employs a glow plug or other hot surface projected into the combustion chamber. Natural gas impacting on such a hot surface will ignite and burn.

A second ignition assist strategy is to use a small quantity of diesel as a pilot fuel. Here diesel is injected into the combustion chamber shortly before or at approximately the same time as the natural gas is injected, when the piston is near top dead center. As diesel will generally auto-ignite under the conditions established within the chamber when the piston is near top dead center, the combustion of this diesel will trigger the ignition of the main gaseous fuel, such as natural gas.

In this disclosure, "near top dead center" means within 30 degrees of top dead center.

There are technical challenges associated with both approaches. With hot surface ignition, if combustion is initiated at one point within the combustion chamber, incomplete combustion can occur resulting in increased hydrocarbon emissions and loss of combustion energy that could otherwise be utilized to drive the piston. In order to promote complete combustion, the flame generated at the hot surface needs to be propagated throughout the combustion chamber so that all of the injected natural gas is ignited. However, since flame propagation can be imperfect, gas directed into parts of the chamber furthest removed from the glow plug may fail to ignite or it may burn incompletely. See by way of example Mueller, C. J. and Musculus, M. P., "Glow Plug Assisted Ignition and Combustion of Methanol in an Optical DI Diesel Engine", SAE paper 2001-01-2004. If flame propagation is not rapid enough to initiate combustion of gas within the combustion chamber, the directly injected quantities of natural gas may become too lean for ignition.

When using pilot fuel for the ignition assist strategy, two fuels must be accommodated. That is, a separate fuel supply system is needed, adding complexity in the engine. Also, depending on the amount and type of pilot fuel, there may be undesirable emissions generated by combustion of the pilot fuel.

Further, a pilot fuel system adds cost to a natural gas engine. There are the capital costs associated with the pilot fuel system as well as the maintenance time and costs for such maintenance.

Other means may be used to help ignite HPDI™ natural gas engines. By way of example, natural gas can be spark-ignited after the gas is directly injected. However, spark ignition of a directly injected natural gas has many of the same challenges as glow plug ignition.

The present invention addresses the problems noted above.

SUMMARY OF THE INVENTION

This invention provides methods and apparatus relating to the operation of internal combustion engines.

One aspect of this invention provides a method and apparatus to assist ignition of a directly injected gaseous fuel. The method preheats the intake charge above the auto-ignition temperature of natural gas under the conditions found within the combustion chamber.

The method and apparatus may establish an ignition environment throughout the intake charge prior to introduction of a main quantity of gaseous fuel into the combustion chamber.

Another aspect of the invention provides a method of operating an internal combustion engine by directing an intake charge into a combustion chamber, compressing that intake charge within the combustion chamber and determining when engine load is equal to or greater than a predetermined threshold load. When engine load is equal to or greater than the predetermined threshold load the engine is operated in a first operating mode. The first operating mode includes injecting a first quantity of a fuel directly into the combustion chamber and igniting the first quantity of the fuel to raise the temperature of the intake charge above the auto-ignition temperature of the fuel. A second quantity of the fuel is then directly injected into the combustion chamber when the temperature of the intake charge is at or above the auto-ignition temperature of the fuel.

Some embodiments of the invention include determining a series of points on an engine load map where each point corresponds to distinct load conditions. The first quantity of the fuel may be ignited by a glow plug. The first quantity may be introduced between 60 and 30 crank angle degrees before top dead center.

It is desirable to provide the auto-ignition temperature of the fuel within the intake charge when the piston is at top dead center.

The second quantity may include a greater mass of fuel than the first quantity.

The injection of the second quantity of the fuel may be timed so that most of the second quantity ignites and burns during a power stroke of the piston. For example, the second quantity of the fuel may be injected when the piston is near top dead center.

Some embodiments provide a second operating mode wherein the fuel is injected directly into the combustion chamber. The timing of the injection of the fuel provides the majority of the fuel burns during a power stroke of a piston. The fuel may be ignited by a glow plug. The fuel may be injected in the direction of the glow plug when operating in the second operating mode. The second operating mode may be a low-load mode.

In some embodiments, in the second operating mode, the fuel is injected between −20 and +20 crank angle degrees before top dead center. A secondary injection of fuel that ignites and burns during a power stroke of the piston may be provided.

Another aspect of the invention provides a method of operating a gaseous-fueled internal combustion engine under high-load conditions where a low-load or a high-load is selected. Under high-load the method includes directing an intake charge into a combustion chamber and compressing the intake charge within the combustion chamber during the compression stroke of the piston. During the compression stroke of the piston a pilot quantity of a fuel is provided into the compressed intake charge within the combustion chamber. This pilot quantity is then burned. The temperature of the intake charge is raised and when that temperature meets or exceeds the auto-ignition temperature of the fuel a main quantity of the fuel is directed into the intake charge.

A further aspect of the invention provides a method of establishing an auto-ignition environment within a combustion chamber of a operating gaseous-fueled internal combustion engine. The method includes compressing an intake charge and burning a first quantity of a fuel within the combustion chamber and raising the temperature of the intake charge. This is done during the compression stroke. Once the temperature is at or exceeds the auto-ignition temperature of the fuel a second quantity of the fuel is directly injected into the combustion chamber.

The invention further contemplates using, as a fuel, natural gas or a fuel that includes methane.

Some embodiments of the invention provide a high-pressure injection valve that will deliver a directed pilot quantity of gaseous fuel onto a hot surface prior a main quantity of the gaseous fuel. The fuel injection valve comprises a hollow valve body comprising a valve tip insertable into the combustion chamber. A pilot fuel nozzle orifice provided within the valve tip for injecting fuel in the direction of a device for assisting ignition of the gaseous fuel is also included. Further, a plurality of main fuel nozzle orifices for injecting fuel into a larger proportion of the combustion chamber compared to the pilot fuel nozzle orifice is included along with a valve needle disposed within the hollow valve body. The valve needle is movable between three positions. The first is a closed position wherein a pressurized quantity of the fuel is contained within the hollow valve body. The second is a first open position, wherein the fuel is injectable through the pilot fuel nozzle orifice and only the pilot fuel nozzle orifice. The third is a second open position wherein the fuel is injectable through the pilot fuel nozzle orifice and the plurality of main fuel nozzle orifices. The fuel may comprise a gaseous fuel including, for example, natural gas or a fuel that comprises methane.

In some embodiments, the injection valve comprises a needle tip extending from a stem portion of the valve needle that has a larger cross-sectional area than the needle tip. An annular shoulder is disposed between the needle tip and the stem portion wherein the annular shoulder comprises a sealing surface that cooperates with a valve seat to seal the gaseous fuel within the hollow valve body when the sealing surface is urged against the valve seat. Further, the injection valve needle tip cooperates with an interior surface of the hollow valve body to prevent the fuel from exiting the hollow valve body through the main fuel nozzle orifices when the valve needle is in the first open position.

In the injection valve, a radial surface of the needle tip may fit closely within a well within the valve tip. The clearance gap between the needle tip and side walls of the well provide a fluid restriction that substantially prevents the gaseous fuel from flowing to the main fuel nozzle orifices when the valve needle is in the first open position. The valve needle may be retractable within the hollow valve body so that the needle tip is lifted out of the well whereby gaseous fuel may flow to the main fuel nozzle orifices.

The needle tip may be movable relative to a stem of the valve needle. An end surface of the needle tip may be seated against a second valve seat provided by an interior surface of the hollow valve body when the valve needle is in the first open position. The needle tip may be lifted away from the second valve seat when the valve needle is in the second open position. The needle tip may be urged against the second valve seat by a spring or other bias mechanism disposed between the needle tip and the stem when the valve needle is in either the closed position or the first open position. The needle tip may comprise a flange that cooperates with a lip of the stem whereby retraction of the stem into the hollow valve body beyond a predetermined distance lifts the needle tip away from the second seat.

The pilot fuel nozzle orifice may be one of a plurality of pilot fuel nozzle orifices, with a combined open area that is less than the combined open area of the plurality of main fuel nozzle orifices. The pilot fuel orifices may be oriented to inject the gaseous fuel into a sector of the combustion chamber that comprises the device for assisting ignition.

A plurality of main fuel nozzle orifices may be provided. In some embodiments of the invention the main fuel nozzle orifices are not used to inject fuel in the direction of the device for assisting ignition.

A further embodiment includes actuating the needle between the closed position, the first open position, and the second open position using a first closing bias, a second closing bias, a third closing bias, a first opening bias and a second opening bias. The first closing bias, the second closing bias and the third closing bias can be a first fluid force, a second fluid force and third fluid force, respectively, acting upon the needle—against the first opening bias and the second opening bias. The first fluid force would be greater than a first opening force delivered by the first opening bias and a second opening force delivered by the second opening bias thereby actuating the needle to the closed position. The second fluid force would be greater than the first opening force and less than the second opening force, thereby actuating the needle to the first open position. The third fluid force would be less than the first opening force, and, the second opening force thereby actuating the needle to the second open position.

In a further embodiment the first opening bias is provided by a stiff spring and the second opening bias is provided by a soft spring. The stiff spring and the soft spring would act between the needle and the valve tip.

Another aspect of the invention provides an internal combustion engine comprising a combustion chamber substantially defined by a cylinder, a piston reciprocable within the cylinder and a fire deck of a cylinder head. A device is disposed within the combustion chamber for assisting ignition of the gaseous fuel. A fuel injection valve for injecting a gaseous fuel directly into the combustion chamber is provided. The fuel injection valve comprises a hollow valve body comprising a valve tip insertable into the combustion chamber, a pilot fuel nozzle orifice within the valve tip for injecting fuel in the direction of the device, a plurality of main fuel nozzle orifices for injecting fuel into a larger proportion of the combustion chamber compared to the pilot fuel nozzle orifice. The plurality of main fuel nozzle orifices have a combined open area larger than an open area associated with the pilot fuel nozzle orifice. A valve needle is disposed within the hollow valve body. The valve needle is movable between a closed position, wherein a pressurized quantity of the gaseous fuel is contained within the hollow valve body, a first open position, wherein the gaseous fuel is injectable only through the pilot fuel nozzle orifice, and a second open position wherein the gaseous fuel is injectable through the pilot fuel nozzle orifice and through the plurality of main fuel nozzle orifices.

The valve tip may be substantially centrally located on the fire deck, and the device for assisting ignition may be spaced a radial distance from the valve tip. The device for assisting ignition may comprise a glow plug.

Further, where a glow plug is used, the engine would preferably further comprise a glow plug shield. In a preferred embodiment, a least a portion of the shield is positioned in the combustion chamber between the glow plug and the fuel injection valve. The shield could further surround the glow plug. And in a further embodiment, the shield could define at least two fuel passages, at least one entry passage and at least one exit passage. The at least one entry passage would be for receiving a first quantity of the gaseous fuel where the first quantity of the gaseous fuel is ignited by the glow plug. The at least one exit passage would be for directing a flame into a second quantity of the gaseous fuel beyond the exit passage and directed around the shield.

The flame would be generated during combustion of the first quantity of the gaseous fuel. In a further embodiment, the first quantity of fuel is directed by the pilot fuel nozzle orifice into the entry passage.

The engine may comprise a controller for commanding the valve needle. When the controller is commanded to operate under a high-load operating mode, the controller commands the valve needle to the first open position when the piston is between 60 and 30 crank angle degrees before top dead center during operation of the engine. The controller may also command the valve needle to operate above a predetermined threshold load. The controller operates in a first operating mode wherein controller commands valve needle to the first open position when the piston is between 60 and 30 crank angle degrees before top dead center. The controller will also command the valve needle to the second open position when the combustion chamber is at or above the auto-ignition temperature of the gaseous fuel. In some embodiments, the controller may determine a threshold load from a series of points on an engine load map, each point corresponding to distinct load conditions.

A further embodiment of the invention provides for a glow plug shield for use in a combustion chamber of a gaseous-fuelled direct injection internal combustion engine that uses the method taught in the disclosure. The glow plug shield comprising an outside face and an inside face opposite the outside face. The shield defines at least one entry radial plane and at least one exit radial plane. Each radial plane projects from the outside face where each of the at least one entry radial plane and the at least one exit radial plane define at least one intersection line projecting back from the inside face for each the at least one entry radial plane and the at least one exit radial plane. Also, each of the at least one entry radial plane and the at least one exit radial plane define at least one entry line where the at least one entry radial plane intersects the outside face and define at least one exit line where the at least one exit radial plane intersects the outside face. All angles between all the at least one entry radial plane and all the at least one exit radial plane at the at least one intersection line should be greater than 45 degrees. The shield also defines at least two passages, an entry passage and an exit passage, the entry passage being centered on each the at least one entry line and the exit passage being centered on each the at least one exit line. As well, the glow plug shield can be a cylindrical shape. In a further embodiment, the glow plug shield can define a top plane where the shield would be suspended from a fire deck within a combustion chamber of an internal combustion engine. The entry passage and the exit passage as such are equidistant from the top plane. The passage can also be a hole in a preferred embodiment.

A further embodiment of the subject invention includes a method of operating an internal combustion engine. The method comprises directing an intake charge into a combustion chamber, compressing the intake charge within the combustion chamber, and determining when engine load is equal to or greater than a predetermined threshold load. When the engine load is equal to or greater than the predetermined threshold load the engine would operate in a first operating mode. The first operating mode comprises, while compressing the intake charge, injecting a first quantity of a fuel at an entry passage defined by a glow plug shield extended into the combustion chamber. The glow plug shield is disposed between the injector and a glow plug proximate to the shield. The first quantity of the fuel is ignited on the glow plug after passing through the entry passage. A flame from combustion of the first quantity of the fuel is directed at a second quantity of the fuel through an exit passage defined in the shield. The second quantity of the fuel is directed past the shield and beyond the exit passage. The flame causes the second quantity of the fuel to ignite. The combustion of the first and second quantity increases temperature of the intake charge within the combustion chamber. Finally, a third quantity of the fuel is injected directly into the combustion chamber near completion of compression of the intake charge when a temperature of the intake charge is at or above an auto-ignition temperature of the fuel.

In a further embodiment, the method includes where the fuel is a gaseous fuel. The gaseous fuel comprises at least one of methane, ethane, propane, butane and hydrogen.

Further aspects of the invention and features of specific embodiments of the invention are described below.

BRIEF DESCRIPTION OF THE DRAWINGS

In drawings which illustrate non-limiting embodiments of the invention:

FIG. 2a shows a side view cross-section of the combustion chamber. FIG. 2b shows a top view of the combustion chamber across section line 2B—2B shown in FIG. 2a.

FIG. 3a shows a side view cross-section of the combustion chamber. FIG. 3b shows a top view of the combustion chamber across section line 3B—3B shown in FIG. 3a.

In FIG. 5, the fuel injection valve is closed.

FIG. 12 shows two views of an embodiment of the hot surface assembly for use with the subject invention.

DETAILED DESCRIPTION OF PREFERRED EMBODIMENT(S)

In the present invention, a method and apparatus are provided to create an environment within a combustion chamber suitable for auto-ignition and combustion of natural gas in the combustion chamber.

Figure 1:
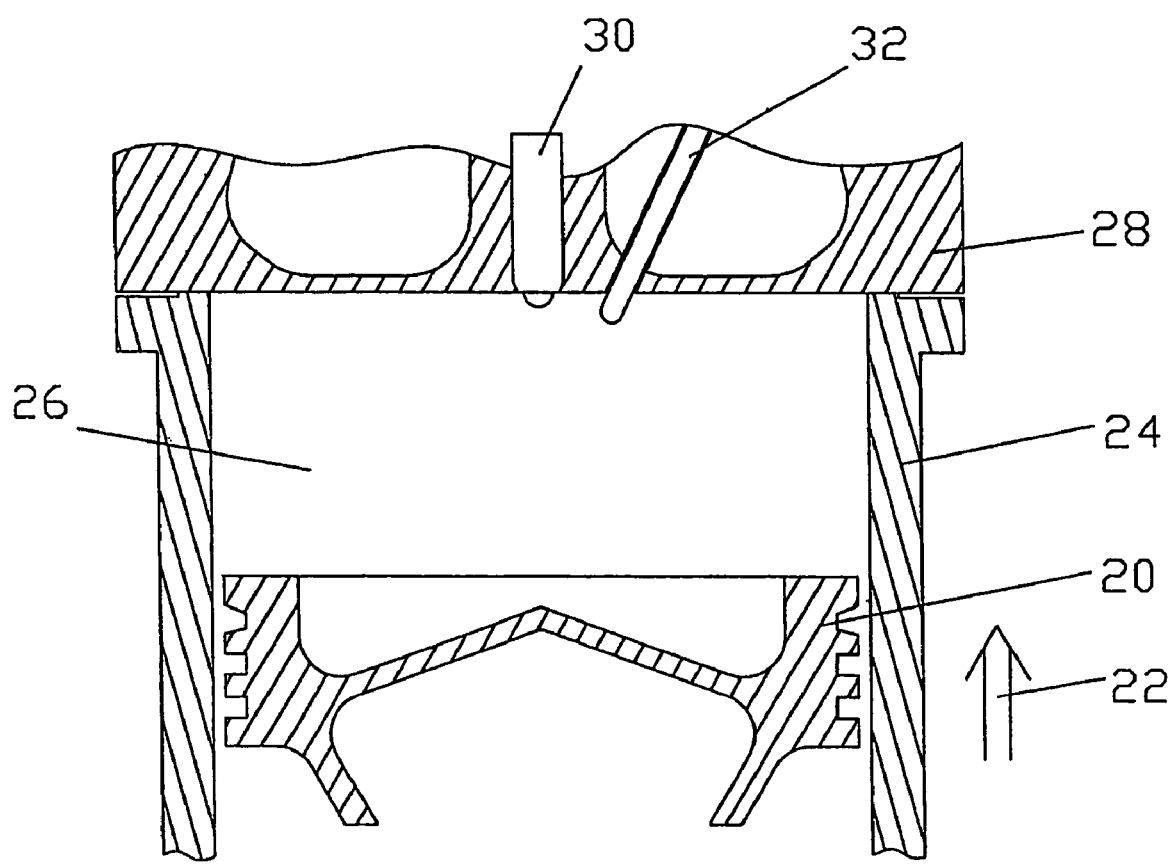
FIG. 1 shows a side view cross-section of a combustion chamber of an internal combustion engine, with a gaseous fuel injection valve and glow plug. The combustion chamber is shown during the compression stroke, prior to injection of natural gas into the combustion chamber.

Referring to FIG. 1, a side view cross section of a combustion chamber is shown. In the illustrated embodiment, piston 20 is moving in the direction of arrow 22 within cylinder 24. Combustion chamber 26 is defined, in part, by cylinder 24, piston 20 and the fire deck of cylinder head 28. Also shown are injection valve 30 and glow plug 32, both of which project into combustion chamber 26.

Figure 2A:
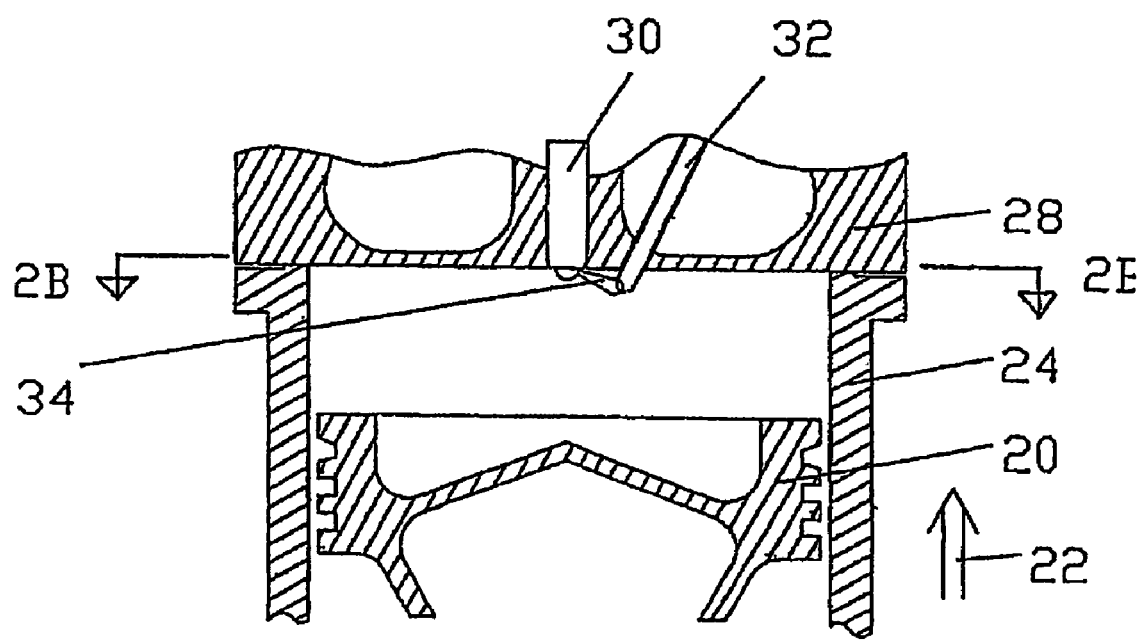
FIGS. 2a and 2b show two views of the same embodiment as FIG. 1, but later in the compression stroke, when a pilot quantity of a gaseous fuel is being introduced into the combustion chamber.
Figure 2B:
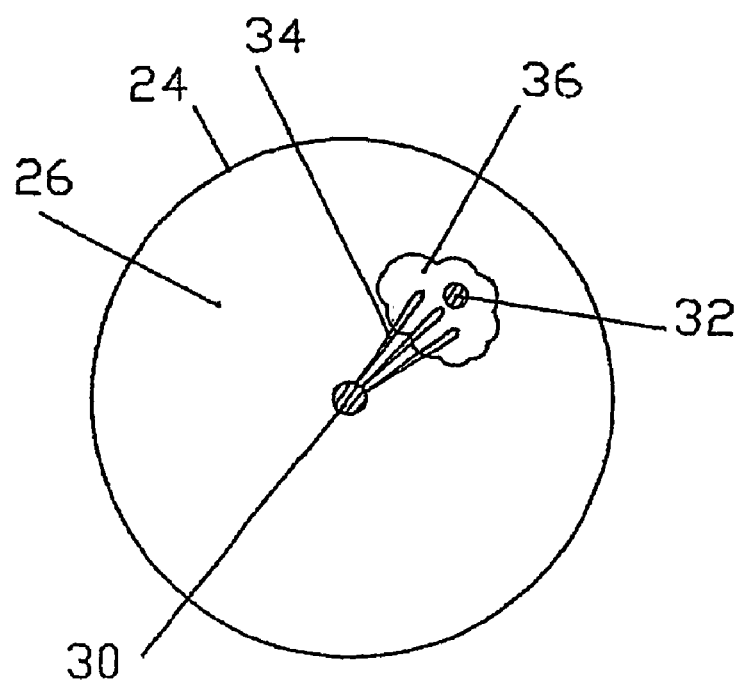

Referring to FIGS. 2a and 2b, the same embodiment that is shown in FIG. 1 is shown at a later time within the compression cycle of the engine. With respect to this embodiment, the same reference numerals are employed to identify the same features in all of the figures. Natural gas is directly injected into combustion chamber 26 in pilot fuel jets 34, which are directed towards glow plug 32 where combustion occurs in pilot fuel combustion zone 36. FIG. 2a is a side view cross-section and FIG. 2b shows a top view of combustion chamber 26 seen through section line 2B—2B shown in FIG. 2a.

Figure 3A:
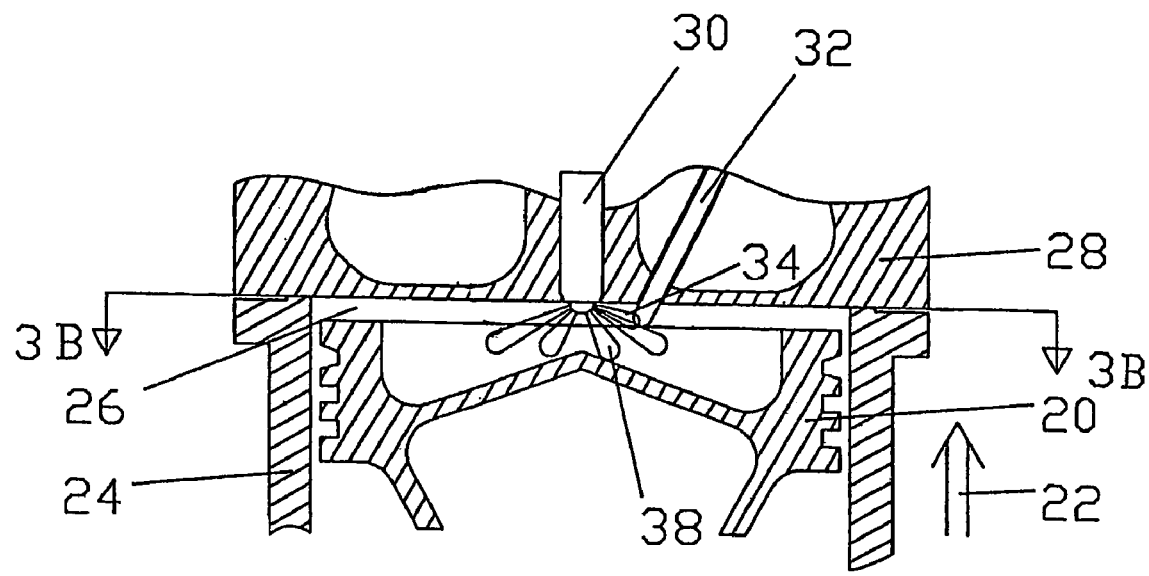
FIGS. 3a and 3b show two views of the same embodiment as FIGS. 1 and 2, but when the piston is at or near top dead center near the completion of the compression stroke and the main quantity of the gaseous fuel is being injected into the combustion chamber.

Referring to FIG. 3, the embodiment of FIGS. 1 and 2 is shown when piston 20 is at or near top dead center near the completion of the compression stroke moving in the direction of arrow 22. Here the main quantity of natural gas is directly injected throughout combustion chamber 26 in main fuel jets 35. At this stage, combustion zones 38 are forming around pilot fuel jets 34 and main fuel jets 35.

Figure 3B:
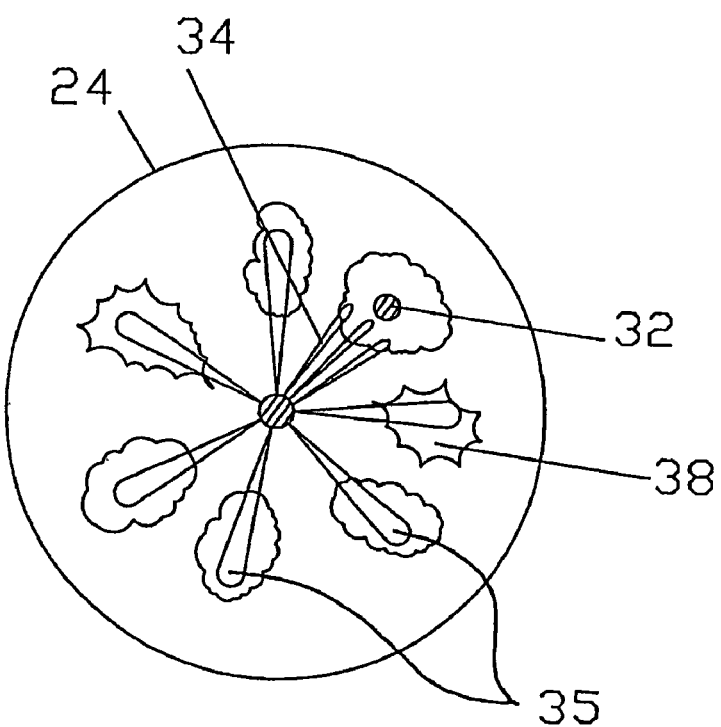
Figure 4:
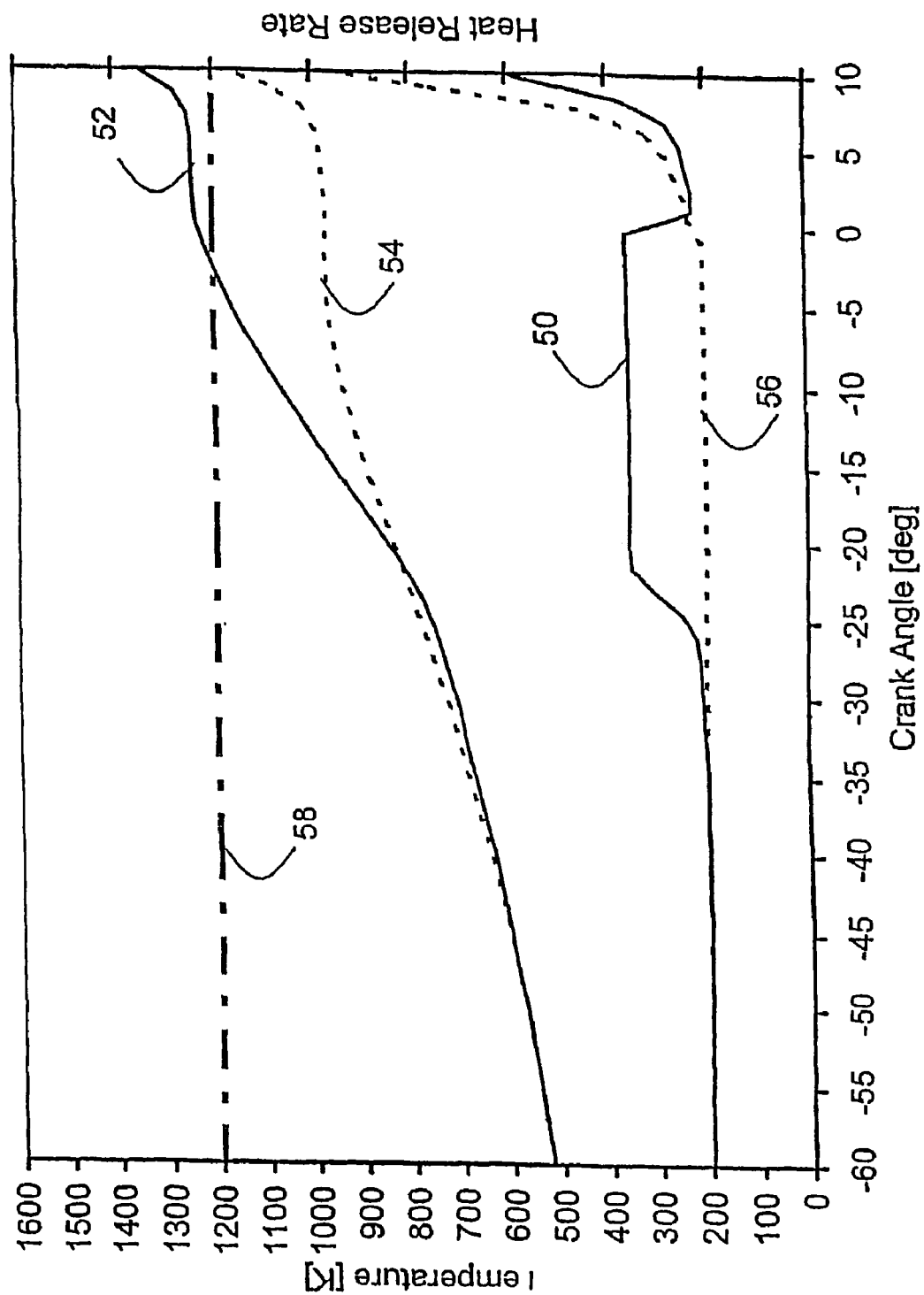
FIG. 4 is a graph demonstrating intake charge temperature and natural gas heat release rate versus crank angle.

FIG. 4 provides a graph plotting heat release rate (line 50) within combustion chamber 26, and combustion chamber temperature (line 52), both against crank angle measured in degrees of rotation for the embodiment illustrated in FIGS. 1 through 3 utilizing the disclosed method. For comparison to lines 50 and 52, also shown is line 54, which is a temperature curve, and line 56, which is a heat release rate curve for the same combustion chamber of an internal combustion engine. These lines show conditions in the combustion chamber when no pilot quantity of natural gas is used to precondition of the intake charge. Also shown is line 58, which shows the auto-ignition temperature for a typical compression ignition diesel engine fuelled with natural gas under high-load conditions as measured for such a diesel engine.

FIGS. 1 through 4 illustrate a preferred steps in a method of operating a preferred embodiment of the apparatus when the engine is operating under high-load conditions. FIGS. 1 and 2 also help demonstrate a preferred method of operation of under low-load conditions. The steps in this method for both high-load and low-load will be discussed in greater detail below.

Referring to FIGS. 1 and 4, piston 20 is shown moving in the direction of arrow 22, towards top dead center during the compression stroke of the engine. Piston 20 is compressing the intake charge introduced into the combustion chamber during the intake stroke. The intake stroke, not shown, immediately preceded the compression stroke. The intake charge may be a mass volume of fresh air with or without some exhaust gas recirculation (EGR) or other intake charge compositions, as would be understood by a person skilled in the art.

During the compression stroke the intake charge temperature increases. For a given compression ratio of the engine, the temperature rise during compression is limited. Referring to FIG. 4, through to approximately 30 degrees prior to top dead center, compression of the intake charge alone is responsible for increasing the temperature of the intake charge. Referring to FIGS. 2 and 4 in order to augment the temperature increase of the intake charge, pilot fuel jets 34 introduce natural gas into combustion chamber 26 during the latter part of the compression stroke. Pilot fuel jets 34 are directed towards glow plug 32. In the vicinity of glow plug 32, this pilot quantity of natural gas ignites in pilot fuel combustion zone 36. The combustion of the pilot quantity of natural gas, along with additional compression of the intake charge during completion of the compression stroke significantly increases the temperature of the intake charge within combustion chamber 26. Combustion of the pilot quantity of natural gas in the vicinity proximate to the glow plug causes the temperature of the intake charge to increase throughout the combustion chamber. Referring to FIG. 4, the quantity of natural gas injected as pilot fuel is provided at between 45° and 40° prior to top dead center. Heat release line 50 shows that combustion commences at between 25° and 30° prior to top dead center. The heat release raises the temperature of the intake charge through to a point between 5° and 0° prior to top dead center. In this same range, the temperature within the chamber exceeds the natural gas auto-ignition temperature shown by line 58.

A glow plug shield, not shown, may be provided to protect the glow plug and to enhance combustion of the pilot fuel.

Referring to FIG. 3, by the time piston 20 is at or near top dead center, which is at or near the commencement of the power stroke, main gaseous fuel is introduced in main fuel jets 35. The intake charge at this point, after combustion of the pilot fuel, provides a combustion environment wherein natural gas will auto-ignite. As well, there may be residual pockets of burning pilot fuel that may ignite some of the directly injected main fuel jets 35. By way of example, such residual combustion may exist within the combustion chamber where the pilot quantity is introduced late in the compression stroke and/or where the pilot quantity is an amount sufficient to sustain combustion of natural gas through to the main injection of the natural gas.

The quantity, timing and flow rate of natural gas pilot fuel jets is determined to be sufficient to deliver an auto-ignition environment within the combustion chamber upon commencement of direct injection of the main quantity of natural gas. In the example illustrated by FIG. 4, and discussed above, the gaseous pilot fuel is introduced between 45° and 40° prior to top dead center. However, depending upon the engine and the operating conditions, the introduction of the pilot quantity of natural gas preferably occurs at a time between 60° and 30° prior to top dead center. An injection earlier than 60° prior to top dead center and later than 30° prior to top dead center may not be able to raise the temperature of the intake charge to auto-ignition conditions before the main quantity of gaseous fuel is injected near top dead center. Also, combustion of pilot fuel prior to top dead center imparts some heat losses through the cylinder. These losses may become more significant when pilot fuel combustion commences earlier in the compression stroke. Furthermore, additional energy required to compress the intake charge after heating it is reduced when the auto-ignition temperature is reached at or near top dead center as opposed to earlier in the compression stroke.

As mentioned above, the method is preferably practiced when the engine is operating under high-load conditions. Under high-load conditions, the quantity of pilot fuel required to generate an auto-ignition temperature within the intake charge as compared to main fuel used to drive the piston is relatively small.

Under low-load conditions, the difference between the quantity of pilot fuel and the quantity of main fuel is smaller. Less main fuel is needed under low-load conditions to drive the pistons. As such, under low-load conditions, using the method preferred for high-load conditions, the energy imparted during the compression stroke to reach auto-ignition temperatures generally may become comparable to the energy imparted during the power stroke. As such, the combustion of the pilot quantity of natural gas may begin to impede engine operation.

By way of example, it is preferred that the quantity (mass) of pilot fuel be less than 50% of the total quantity (mass) of fuel delivered to the combustion chamber over a given cycle. For the purposes of this disclosure, where the quantity of pilot fuel (mass) required to achieve auto-ignition conditions within the combustion chamber is greater than 100% of the main fuel needed to meet the load demands of the operator in light of the pilot fuel provided, the engine will be considered to be operating under a low-load operating mode. Otherwise, the engine will be considered to be operating under a high-load operating mode.

While it may be possible to operate under low-load conditions utilizing the embodiment discussed above, an alternate low-load operating method is preferred. Under low-load conditions, the same apparatus may be employed to inject fuel through the pilot fuel nozzle orifices. However, instead of injecting the fuel through the pilot fuel nozzle orifices early in the compression stroke to establish an auto-ignition environment, the gaseous fuel is injected later, at or near top dead center, preferably within 20 degrees of top dead center, so that the combustion of the gaseous fuel injected through the pilot fuel nozzle orifices drives the engine during the power stroke. As fuel requirements are relatively small under low-load conditions, the fuel injected through the pilot fuel nozzle orifices is sufficient to satisfy the desired energy requirements to drive the engine through a wide range of low-load operating conditions. Further, as all the fuel used under this preferred low-load operating condition would be provided through pilot fuel nozzle orifice(s) of the injection valve, it is all directed at the glow plug. Therefore, most of the fuel is burned, reducing concerns related to hydrocarbons emissions and efficiency.

When operating under low-load, if the amount of natural gas injected through the pilot fuel nozzle orifice(s) is not sufficient to provide all the energy needed to drive the piston supplemental energy can be provided by introducing fuel through the main fuel nozzle orifice(s). This fuel would be introduced following or concurrent with the fuel introduced through the pilot fuel nozzle orifice(s). In this low-load preferred method of operation, the ignition of any such supplemental fuel is assisted by combustion of fuel provided through the pilot fuel nozzle orifice(s). In general, under low-load conditions, the combustion of the fuel injected through the pilot fuel nozzle orifice(s) may not increase the temperature of the intake charge above the auto-ignition temperature prior to the introduction of the supplemental quantity of fuel. Therefore, flame propagation arising from combustion of the fuel injected through the pilot fuel nozzle orifice(s) is used to burn the supplemental quantity of fuel rather than auto-ignition.

The operating mode may also be determined by a controller. The engine could be calibrated to provide an engine load map where each point on the map would correspond to a distinct load condition. Once the controller determined that the engine was operating above the load conditions identified for a given set of operating parameters for the engine, the controller would command the disclosed method to be used. The calibration to determine the load map would be based on a number of engine parameters including the relative pilot fuel requirement necessary to establish an auto-ignition environment within the combustion chamber and the amount of main fuel required to meet the load requirements considering the pilot requirements. If this ratio for a given load for a given set of operating parameters exceeded an amount that resulted in unacceptable losses in engine performance, the engine load map would indicate this as a threshold load. The controller could then use this information to command the engine accordingly. Above the threshold an early pilot amount of fuel would be added to achieve auto-ignition conditions (the method used for the high-load mode discussed above), below that amount, the fuel would be added near top dead center (the low-load mode discussed).

Those skilled in the art will understand that the preferred high-load operating method and the preferred low-load operating method work in different ways, and that each method has its respective advantages that make it suitable for the low and high-load operating conditions.

In this disclosure, a the piston is "near top dead center" if it is within 30 degrees of top dead center as measured in degrees of crank-shaft rotation.

Figure 5:
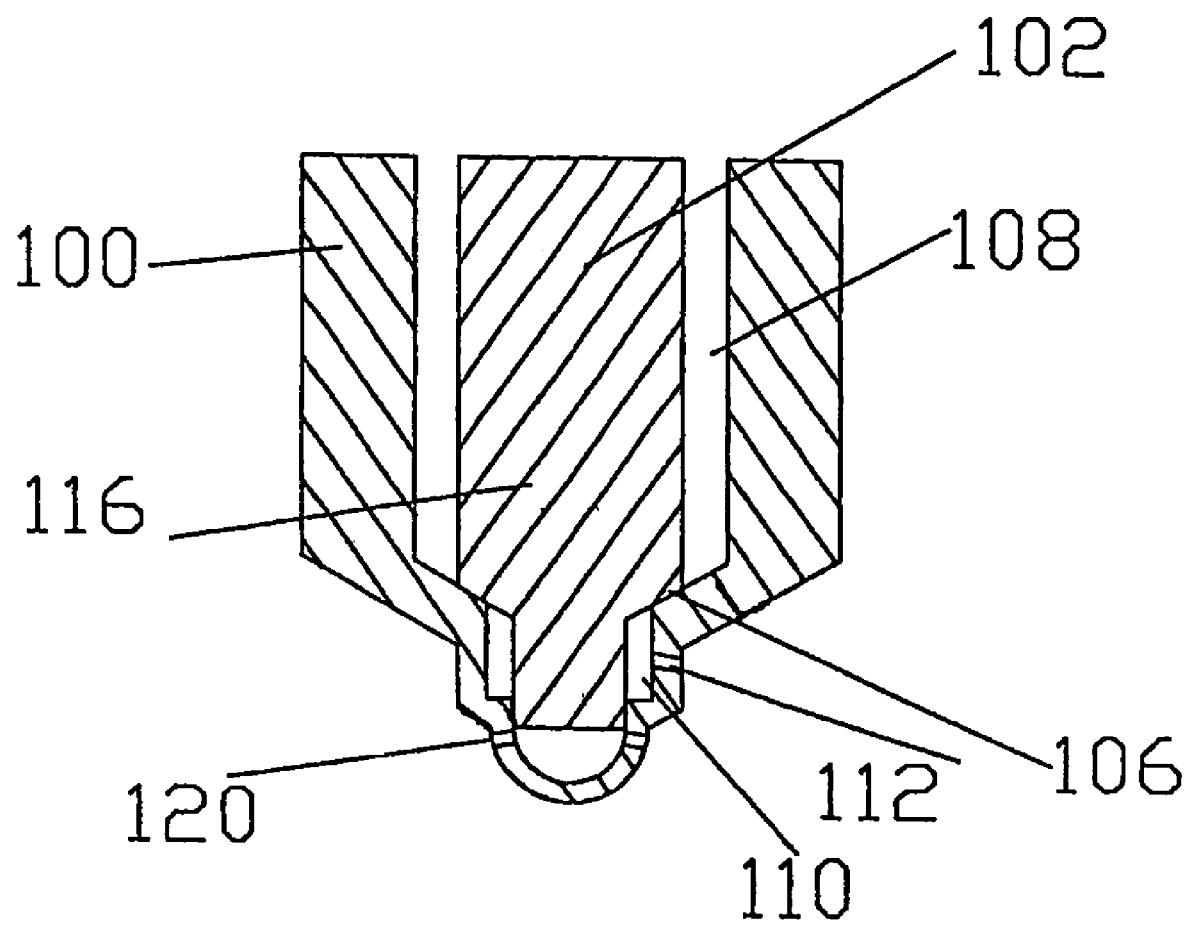
FIG. 5 shows a side view cross-section of an embodiment of a lower portion of a fuel injection valve for injecting a pilot quantity of fuel and a main quantity of fuel.
Figure 6:
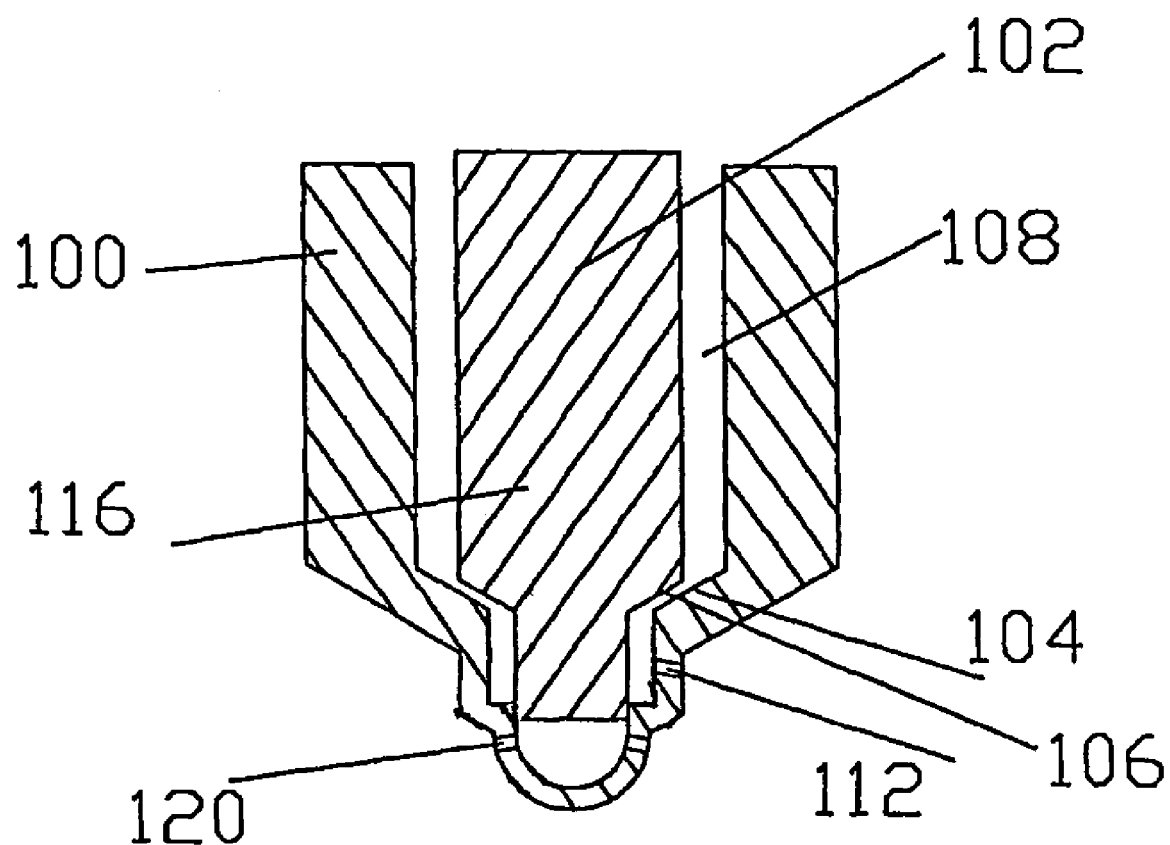
FIG. 6 shows a side view cross-section of the lower portion of the fuel injection valve of FIG. 5, but with the valve needle positioned to allow a pilot quantity of gaseous fuel to be injected into the combustion chamber.
Figure 7:
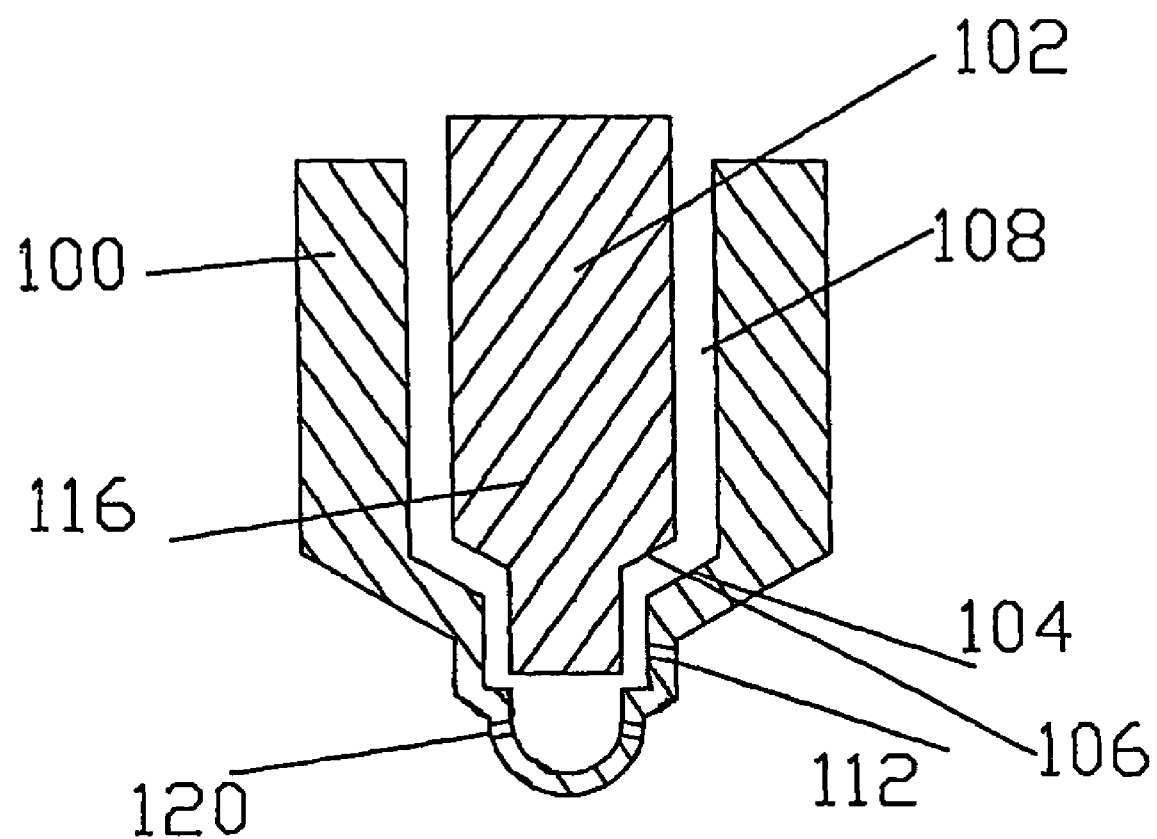
FIG. 7 shows a side view cross-section of the lower portion of the injection valve when the valve needle is positioned to allow a main quantity of the gaseous fuel to be injected into the combustion chamber.

Referring to FIGS. 5 through 7, a first embodiment of an injection valve for use with the method disclosed above is provided. Note for FIGS. 5 through 7 and FIGS. 8 through 10, wherein a second embodiment of an injection valve is provided, each show a close-up of the lower portion of the valve only. Valve tip 100 is shown with valve needle 102 movably disposed within valve tip 100. Valve seat 104 is a surface within valve tip 100 that cooperates with needle sealing surface 106 to separate fuel cavity 108 from pilot fuel nozzle orifice 112 when valve needle 102 is in the closed position, as shown in FIG. 5. A spring member (not shown) is typically employed to bias valve needle 102 in the closed position by urging sealing surface 106 against valve seat 104. As shown in FIGS. 2b and 3b, pilot fuel nozzle orifice(s) 112 are not evenly distributed around the circumference of valve tip 100. Rather, one or more pilot fuel nozzle orifices are preferably oriented to direct a fuel jet only in the vicinity of a glow plug.

Valve tip 100 is installable within the combustion chamber of an internal combustion engine, as shown in FIGS. 1 through 3. When the injection valve is in the closed position, gaseous fuel is prevented from entering the combustion chamber through either the pilot fuel nozzle orifice(s) 112 or the main fuel nozzle orifice(s) 120.

In a common rail style injection valve, gaseous fuel is pressurized within fuel cavity 108, so that when the fuel injection valve is opened, fuel is injected into the combustion chamber. In most operating conditions applicable to a four-stroke engine, the closed position shown in FIG. 5 would be the state of valve tip 100 during the exhaust, intake and early part of the compression stroke.

A feature of the disclosed injection valve is that it has two distinct open positions. In FIG. 6, the injection valve is partially open to allow fuel to be injected into the combustion chamber only through pilot fuel nozzle orifices 112. In FIG. 7, the injection valve is fully open to allow fuel to be injected into the combustion chamber through both pilot fuel nozzle orifice(s) 112 and main fuel nozzle orifices 120.

Referring now to FIG. 6, sealing surface 106 of valve needle 102 is lifted away from valve seat 104, allowing the pressurized fuel contained within fuel cavity 108 to flow through the space between sealing surface 106 and valve seat 104, and into the combustion chamber through pilot fuel nozzle orifice(s) 112. However, the close fit between needle tip 116 and an interior surface of nozzle tip 100 substantially prevents any fuel from flowing from fuel cavity 108 to main fuel nozzle orifices 120. The partially open position shown in FIG. 6 corresponds to the times when gaseous fuel is injected only through pilot fuel nozzle orifice(s) 112, as shown in FIG. 2. As disclosed in the description of the preferred methods, this partially open position is selected to inject a pilot quantity of gaseous fuel during high-load operating conditions, or the main quantity of fuel during low-load conditions.

Referring now to FIG. 7, valve needle 102 is in a fully open position where it is retracted so that fuel may flow from fuel cavity 108, through the space between valve seat 104 and sealing surface 106 and the open space between needle tip 116 and valve tip 100. In this fully open position, gaseous fuel is injected into the combustion chamber through both pilot fuel nozzle orifice(s) 112 and main fuel nozzle orifices 120, which corresponds to the time when fuel is being injected into the combustion chamber as shown in FIG. 3.

Accordingly, this first embodiment of the injection valve may be employed to carry out the method taught above.

The first embodiment of the injection valve requires the ability to accurately control the lift of valve needle 102. By way of example, a mechanical or hydraulic "latch" designed to control lift depending on the desired operating mode of the injection valve could be used. Such a latch might physically stop valve needle 102 from continuing beyond a certain point within the injection valve when actuated. Also, by way of example, as would be understood by a person skilled in the art, the lift of valve needle 102 may be controlled by a piezo-electric mechanism, a solenoid, a magneto-strictive device, or another type of mechanical device to allow for controlled lift of valve needle 102.

A feature of the first embodiment is the simplicity of the single monolithic needle design that controls flow through either pilot fuel nozzle orifice(s) 112 alone, or both pilot fuel nozzle orifice(s) 112 and main fuel nozzle orifices 120.

Figure 8:
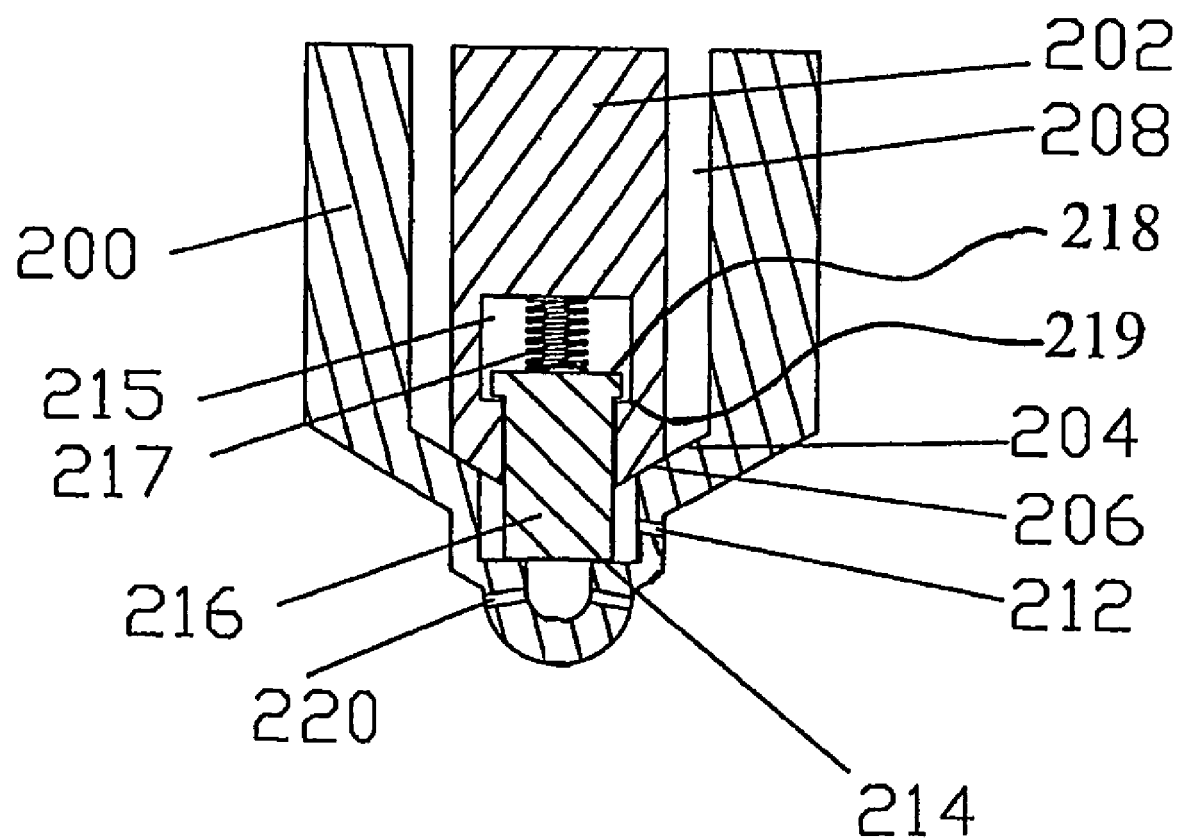
FIG. 8 shows a side view cross-section of another embodiment of a lower portion of a fuel injection valve in the closed position, prior to injection of any fuel into the combustion chamber of an internal combustion engine.
Figure 9:
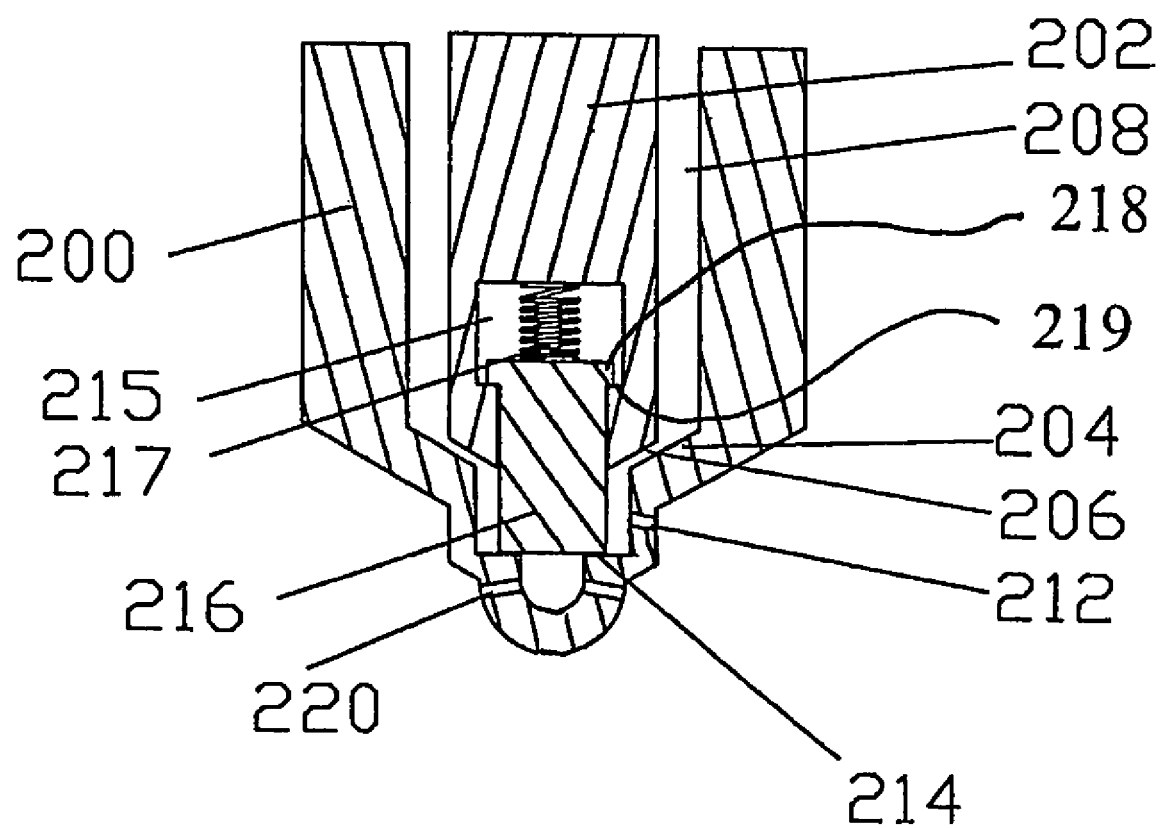
FIG. 9 shows a side view cross-section of the embodiment of FIG. 8 with the valve needle assembly positioned to allow the injection of a pilot quantity of a gaseous fuel into the combustion chamber of an internal combustion engine.
Figure 10:
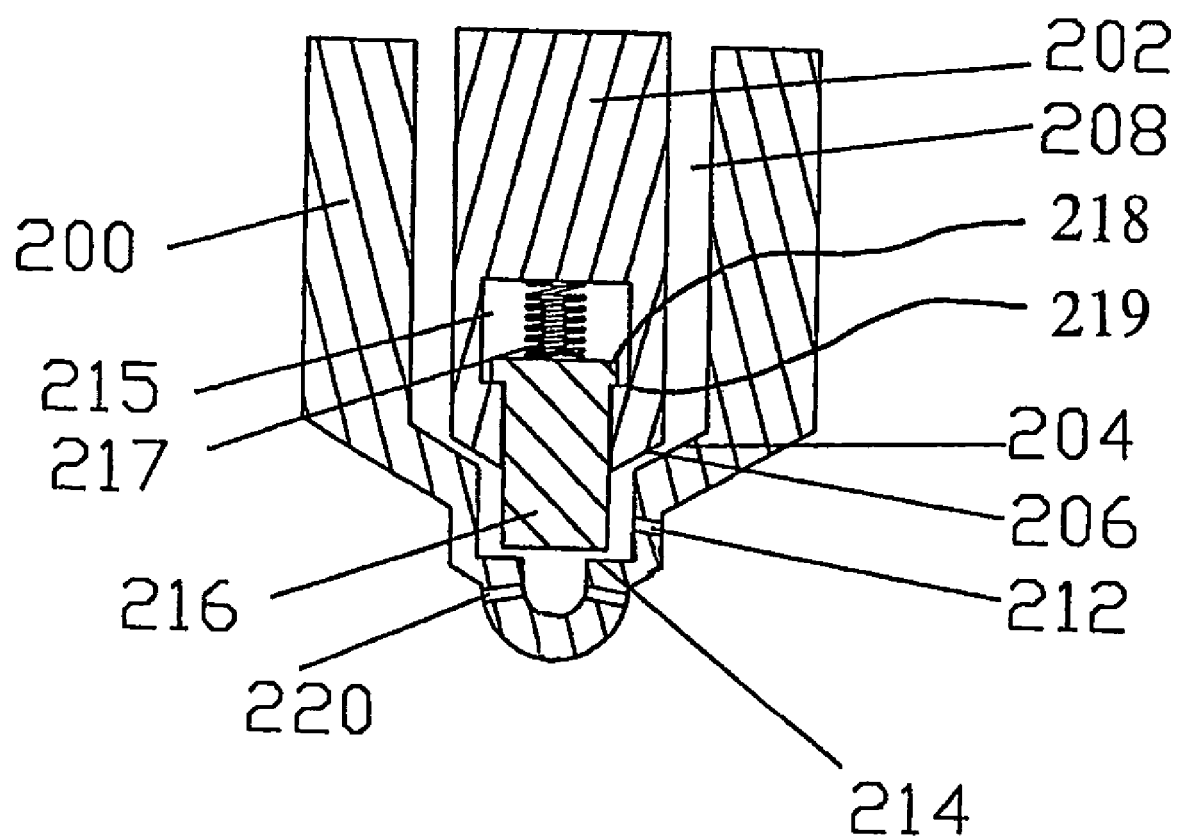
FIG. 10 shows a side view cross-section of the embodiment of FIG. 8 with the valve needle assembly positioned to allow the injection of a main quantity of gaseous fuel into the combustion chamber of an internal combustion engine.

A second embodiment of an injection valve that can be employed with the disclosed methods is illustrated in FIGS. 8 through 10. Valve tip 200 is shown with valve needle 202 movably disposed within valve tip 200. In the closed position shown in FIG. 8, the second embodiment is much like the first embodiment. Pressurized fuel contained within fuel cavity 208 is prevented from flowing to pilot fuel nozzle orifice(s) 212 or main fuel nozzle orifices 220 by sealing surface 206 of valve needle 202, which is urged against valve seat 204. The differences between the first and second embodiments relate to how the respective injection valves function in the partially open and fully open positions, which are described with reference to FIGS. 9 and 10.

The second embodiment of the fuel injection valve comprises needle tip 216 that is movable relative to valve needle 202. When valve needle 202 is in the closed position, actuator 217 allows needle tip 216 to retract within chamber 215 as shown in FIG. 8. For example, when actuator 217 is a spring member, the spring is compressed when the valve is in the closed position.

With reference now to FIG. 9, gaseous fuel can be injected into the combustion chamber through pilot fuel nozzle orifice(s) 212 when sealing surface 206 of valve needle 202 is lifted away from valve seat 204. Gaseous fuel is prevented from flowing from fuel cavity 208 to main fuel nozzle orifices 220 by an end face of needle tip 216 that is seated against secondary valve seat 214. Actuator 217 is expandable to bias the end face of needle tip 216 against secondary valve seat 214 when valve needle 202 is partially lifted. The partially open injection valve illustrated in FIG. 9 provides an apparatus for injecting fuel only through pilot fuel nozzle orifices 212, corresponding to the injection event illustrated in FIG. 2.

Referring now to FIG. 10, by retracting valve needle 202 further than the position in FIG. 9, flange 218 engages lip 219 whereby needle tip 216 is lifted away from secondary valve seat 214. Consequently, gaseous fuel from fuel cavity 208 can then flow through pilot fuel nozzle orifice(s) 212 and main fuel nozzle orifices 220. By injecting the gaseous fuel through main fuel nozzle orifices 220 in addition to pilot fuel nozzle orifice(s) 212, a larger flow area is available enabling larger fuel mass flow rates into the combustion chamber. The addition of main fuel nozzle orifices 220 also enables a broader distribution of fuel within the combustion chamber, instead of only in the vicinity of the glow plug.

As with the first embodiment of the injection valve, the lift of needle 202 may be controlled by a piezo-electric mechanism, a solenoid, a magneto-strictive device or another type of mechanical device that allows for controlled lift of valve needle 202.

Figure 11:
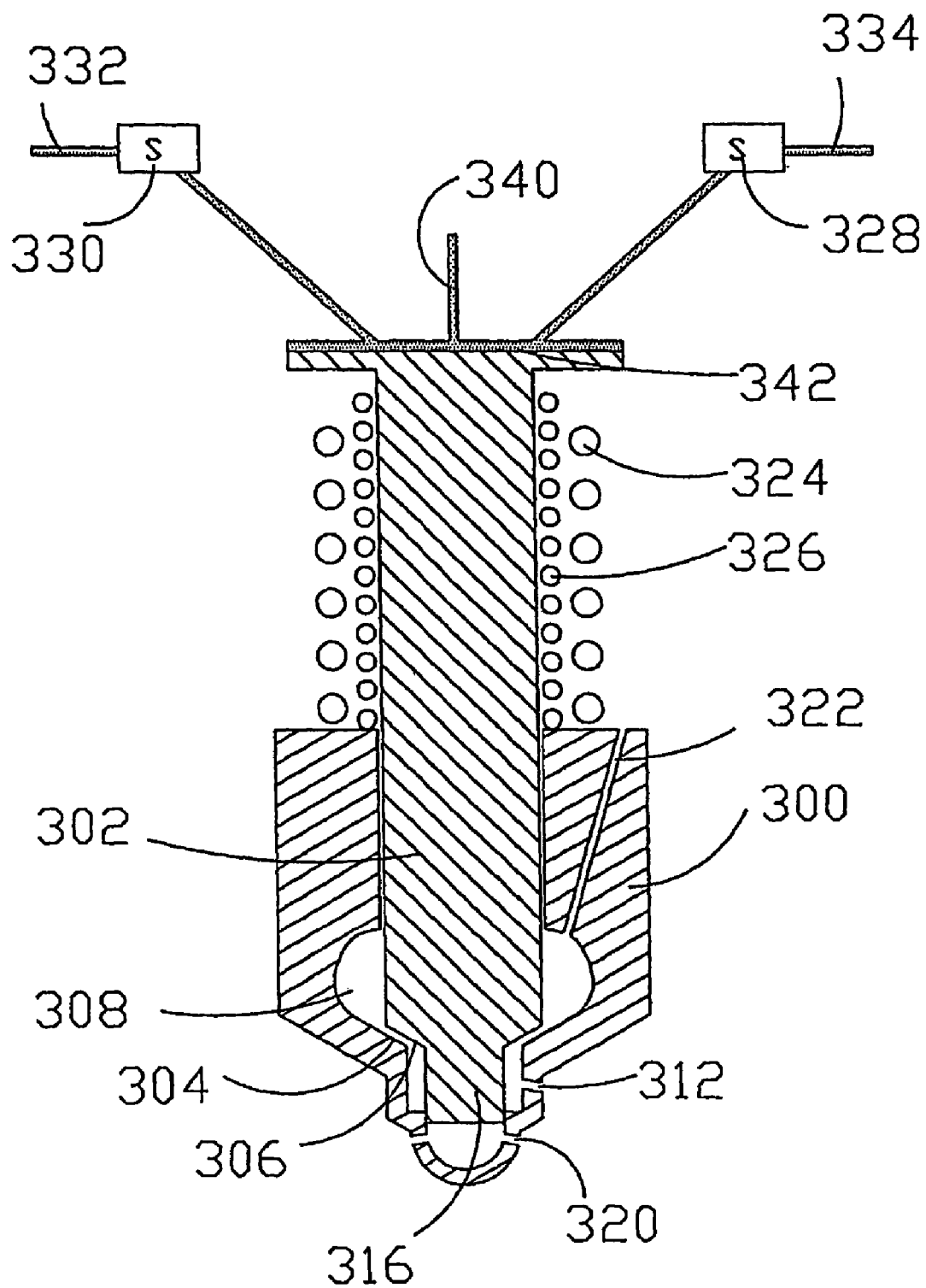
FIG. 11 shows a side cross sectional view of a further embodiment of an injection valve with upstream controls for the valve.

Referring now to FIG. 11, an injection valve is shown with a similar tip design as embodied in the design shown for FIGS. 5 through 7. The embodiment shown includes the upstream control system for the valve. Shown is valve tip 300 with valve needle 302 positioned in valve tip 300. Valve seat 304 is surface within valve tip 300 that cooperates with needle seating 306 to provide a means of separating fuel cavity 308 from pilot fuel nozzle orifice 312 when valve needle 302 is in the closed position where seat 304 abuts needle seating 306. As was the case with earlier embodiment discussed above, pilot fuel nozzle orifice 312 (or orifices) are not evenly distributed around the circumference of valve tip 300. Pilot fuel nozzle orifice 312 is provided to allow for orientation of the orifice to direct a pilot fuel jet only towards the hot surface or glow plug when the injector is positioned in the fire deck.

As with the previous embodiments, the close fit between needle tip 316 and an interior surface of nozzle tip 300 substantially prevents an fuel from flowing from fuel cavity 308 to main fuel nozzle orifices 320. The partially open position shown in FIG. 11 corresponds to a time, tp1, when gaseous fuel is injected only through pilot fuel nozzle orifice(s) 312.///

Where gaseous fuel is desired through orifices 320 at time, tp2, needle 302 pulls needle tip 316 from the interior surface of valve tip 300 thereby allowing gas flow through orifices 320 into combustion chamber heated by earlier pilot injection though orifice(s) 312 as taught above.

Fuel in general is supplied to fuel cavity 308 though injector fuel line 322.

Actuating needle 302 within valve tip 300 can be caused by interaction between stiff spring 324 and soft spring 326 interacting with fluid pressure supply acting on needle head 342 as a result of action of first low pressure solenoid valve 328 and second low pressure solenoid valve 330 disposed in first low pressure line 334 and second low pressure line 332. High pressure line 340 is in communication with the surface of needle head 342 and first low pressure line 334 and second low pressure line 332.

At time tp0, when substantially no gas flow is desired through either pilot fuel nozzle orifice(s) 312 or main fuel nozzle orifice 320, both solenoid valves 328, 330 are closed restricting fluid flow through first low pressure line 334 and second low pressure line 332. As such, high pressure line delivers a high pressure fluid to the surface of needle head 342 which acts to compress both stiff spring 324 and soft spring 326 causing needle seating surface 306 to seal against valve seat 304. At time, tp1, where fuel is required through pilot orifice 312 while still being restricted through main fuel orifices 320, valve 330 is opened to allow a restricted flow of fluid through line 332 and as such relieving pressure on needle head 342. As such, action of stiff spring 324 acts on needle 302 to force open the path defined between valve seat 304 and sealing surface 306. This then allows fuel to flow through to pilot fuel orifice(s) 312. Note that soft spring is calibrated such that it is unable to counter the pressure resulting on needle head 342. At time, tp2, valve 328 is opened allowing a second restricted flow of fluid through line 334 further reducing the pressure on needle head 342. This further reduction of pressure causes soft spring 326 to act upon needle 302 forcing needle tip 316 from the interior surface of valve tip 300 to open a path through to main fuel orifice 320 to flow out into the combustion chamber of the engine.

As would be understood by a person skilled in the art, solenoid valves 330, 328 can be replaced with others means of restricting fluid flow through lines 332, 334. Piezoelectric valves can be used to manage flow through lines 332, 334. As would be understood by a person skilled in the art, when selecting the valve, consideration should be given to the capacity of the valve to act quickly.

Figure 12A:
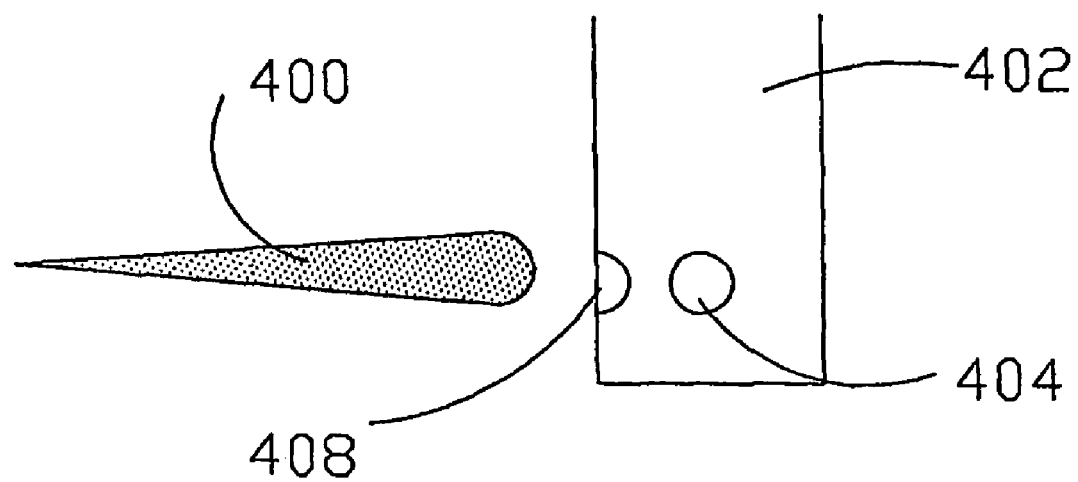
FIG. 12a show a side view of the hot surface assembly at time, t1.
Figure 12B:
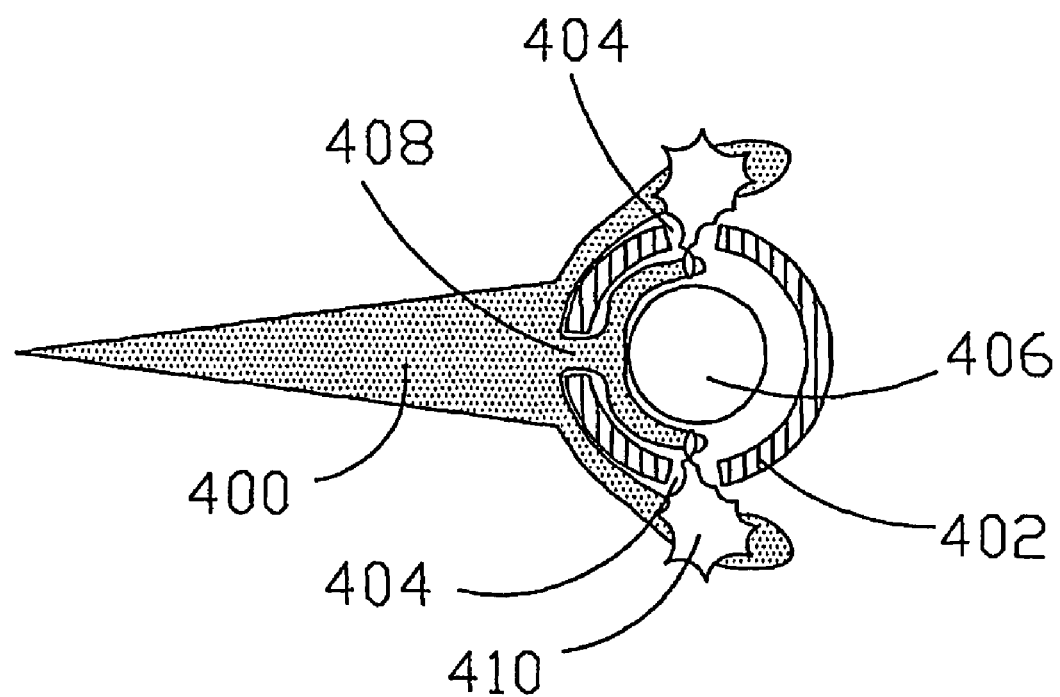
FIG. 12b shows a cross-sectional top view of the hot surface assembly at time, t2.

Referring to FIG. 12, an embodiment of a preferred glow ring and shield configuration is provided for use with the subject invention. Here pilot fuel jet 400 is shown approaching glow plug shield 402 in FIG. 12a and is shown impacting glow plug 406 in FIG. 12b. Shield entry hole(s) 408 and exit holes 404 are shown. In FIG. 12b, flame 410 is shown having been ignited after interacting with glow plug 406.

In practice, by orienting entry hole(s) 408 approximately in-line with the flow of pilot fuel jet 400, fuel jet 400 is introduced to glow plug 406 protected by shield 402. Shield 402 then helps to direct parts of fuel jet 400 around shield 402 past exit holes 404 where flame 410 is directed into fuel jet 400 proximate to shield 402. The provides quick ignition and relatively complete burn of the pilot fuel 400 raising or conditioning the combustion chamber for combustion of main fuel once injected.

Referring to FIG. 12, each of entry and exit holes 408, 404 can be viewed as being centered on a line defined by the intersection point between the shield and a radial plane projecting from the shield. In FIG. 12, the angle between the radial plane associated with entry hole 408 and the radial plane associated with one of exit holes 404 is approximately 90 degrees. However, this can vary. Preferably, angles, in general, greater than 45 degrees between the entry hole and exit holes will also work. Angles much less than 45 degrees can cause unwanted interference between the flame from inside the shield and the entry of additional pilot fuel through this hole. This angle limitation would also include, where referred to in the application, effective angles between the entry and exit holes where the flame is directed by the exit hole on an angle offset from the radial plane that would target the same region outside of the shield as would be the case with a hole generally directing the flame along the radial plane.

As well, while preferably a cylindrical shape is shown in the preferred embodiment discussed above, the shield can be different shapes that provide a protected space between the glow plug and the shield where the shield is positioned generally between the injector and the glow plug. Further, entry and exit passages to provide access for the fuel to the glow plug and access for the resulting flame outside of shield will also work over the preferred passage shown, entry and exit holes, 408, 404.

Note also, that the injection pressure of fuel jet 400 should be controlled to allow for fuel to enter entry hole(s) 408 as desired.

While in the embodiment provided, one entry hole 408 is shown and two exit holes 404 are shown, the invention is not so limited. Entry holes can be distributed on shield 402 in a manner that allows them to be targeted and penetrated by fuel jet 400. Likewise, exit holes 404 should be positioned on shield 402 such that flames projected from ignited portions of fuel jet 400 within shield 402 are projected into parts of fuel jet 410 generally directed around shield 402.

Also, the size of exit holes 404 and entry hole(s) 408 should be sized to allow some fuel to pass through entry hole(s) 408 and guide some fuel around shield 402.

As would be understood by a person skilled in the art, glow plug 406 can be made from material suitable to the temperature and pressures found in an internal combustion engine. The materials chosen for shield 402 are those known in the art. Catalytic coatings on the shield can also be used to provide addition ignition support for fuel jet 400.

While the preferred method utilizes the same fuel for the pilot injection and the main injection, different fuels can be used that might also deliver auto-ignition conditions for the main fuel. This would require an adaptation to the injection valve designs provided as well as the injection strategies. That is, the system would be a dual fuel system and need to be modified accordingly as would be understood by a person skilled in the art.

Other injection valve designs, as would be understood by a person skilled in the art, can be adapted to practice the disclosed method.

While particular elements, embodiments and applications of the present invention have been shown and described, it will be understood, of course, that the invention is not limited thereto since modifications may be made by those skilled in the art without departing from the scope of the present disclosure, particularly in light of the foregoing teachings.

What is claimed is:

1. A method of operating a gaseous-fueled internal combustion engine comprising at least one cylinder partially defining a combustion chamber, the method comprising:
   determining whether a load demand on the engine is within a high-load range,
   when the load demand is within the high-load range, selecting a high-load operating mode for the engine, said high-load operating mode comprising:
   directing an intake charge into said combustion chamber,
   compressing said intake charge within said combustion chamber during a compression stroke of said piston, during said compression stroke of said piston, directly injecting a first quantity of a gaseous fuel into said compressed intake charge within said combustion chamber,
   igniting said first quantity of said gaseous fuel,
   burning said first quantity of said gaseous fuel to assist in raising the intake charge temperature to a temperature at or above the auto-ignition temperature of said gaseous fuel wherein a majority of said first quantity of said gaseous fuel has burned prior to commencement of a piston power stroke,
   directly injecting a second quantity of said gaseous fuel into said intake charge when the intake charge temperature is at or above the auto-ignition temperature or the gaseous fuel,
   wherein combustion of said second quantity of said gaseous fuel contributes to drive a piston power stroke.

2. The method of claim 1 further comprising
   determining when the load demand is within a low-load range for the engine, and;
   when the load demand is within said low-load range, selecting a low-load operating mode for the engine, said low-load operating mode comprising:
   directing an intake charge into said combustion chamber,
   compressing said intake charge within said combustion chamber during a piston compression stroke,
   directly injecting a first quantity of a gaseous fuel into said compressed intake charge within said combustion chamber, when said piston is at or near top dead center,
   igniting said first quantity of said gaseous fuel,
   burning said first quantity of said gaseous fuel,
   wherein combustion of said first quantity of said gaseous fuel contributes to drive a piston power stroke.

3. The method of claim 1 wherein said gaseous fuel is natural gas.

4. The method of claim 1 wherein said gaseous fuel comprises methane.

5. The method of claim 1 wherein said gaseous fuel comprises hydrogen.

6. The method of claim 1, wherein said first quantity of gaseous fuel is injected at a time between 30° and 60° prior to top dead center during the compression stroke of said piston.

7. The method of claim 1, wherein said first quantity of gaseous fuel is injected at a time between 40° and 45° prior to top dead center during the compression stroke of said piston.

8. The method of claim 2, wherein during said low-load operating mode said first quantity of gaseous fuel is injected within 20° prior to top dead center during the compression stroke of said piston.

9. A method of establishing an auto-ignition environment within a combustion chamber of an operating gaseous-fueled internal combustion engine, said combustion chamber partially defined by a piston and having a compression ratio within a range defined by diesel engines, the method comprising:
   directing an intake charge into said combustion chamber,
   while compressing said intake charge within said combustion chamber, injecting a first quantity of a gaseous fuel through an injector directly into said combustion chamber, igniting said first quantity of said gaseous fuel, burning said first quantity of said gaseous fuel and raising a temperature of said intake charge, through said injector, injecting a second quantity of said gaseous fuel directly into said combustion chamber when the intake charge temperature is equal or greater than an auto-ignition temperature of said gaseous fuel, wherein combustion of said second quantity of said gaseous fuel contributes to drive a piston power stroke.

10. The method of claim 9 wherein said first quantity of said gaseous fuel is directed at a glow plug disposed within said combustion chamber.

11. The method of claim 9 wherein said second quantity of said gaseous fuel is directed throughout said combustion chamber.

12. The method of claim 9 wherein said first quantity of said gaseous fuel is directed into said combustion chamber at a first angle as measured from a fire deck of said cylinder and said second quantity of said gaseous fuel is directed into said combustion chamber at a second angle as measure from said fire deck.

13. The method of claim 12 wherein said first angle is less than said second angle.

14. The method of claim 9 wherein said gaseous fuel is natural gas.

15. The method of claim 9 wherein said gaseous fuel comprises methane.

16. The method of claim 9 wherein said gaseous fuel comprises hydrogen.

17. The method of claim 9, wherein said first quantity of gaseous fuel is injected at a time between 30° and 60° prior to top dead center during the compression stroke of said piston.

18. The method of claim 9, wherein said first quantity of gaseous fuel is injected at a time between 40° and 45° prior to top dead center during the compression stroke of said piston.

19. A glow plug shield for use in a combustion chamber of a gaseous fuelled direct injection internal combustion engine, said glow plug shield comprising an outside face and an inside face opposite said outside face, said shield defining:
   at least one entry radial plane and at least one exit radial plane, each radial plane projecting from said outside face, each said at least one entry radial plane and said at least one exit radial plane defining:
      at least one intersection line projecting back from said inside face for each said at least one entry radial plane and said at least one exit radial plane and
      at least one entry line where said at least one entry radial plane intersects said outside face, and,
      at least one exit line where said at least one exit radial plane intersects said outside face,
   wherein:
      all angles between all said at least one entry radial plane and all said at least one exit radial plane at said at least one intersection line are greater than 45 degrees, and
      said shield defines at least two passages, an entry passage and an exit passage, said entry passage being centered on each said at least one entry line and said exit passage being centered on each said at least one exit line.

20. The glow plug shield of claim 19 wherein said shield defines a cylindrical shape.

21. The glow plug shield of claim 20 wherein said shield defines a top plane where said shield would be suspended from a fire deck within a combustion chamber of an internal combustion engine, said entry passage and said exit passage being equidistant from said top plane.

22. The glow plug shield of claim 19 wherein said passage is a hole.

23. A method of operating an internal combustion engine, said method comprising:
   (a) directing an intake charge into a combustion chamber,
   (b) compressing said intake charge within said combustion chamber,
   (c) determining when engine load is equal to or greater than a predetermined threshold load,
   (d) when engine load is equal to or greater than said predetermined threshold load operating in a first operating mode comprising:
      (1) while compressing said intake charge, injecting a first quantity of a fuel at a entry passage defined by a glow plug shield extended into said combustion chamber, said glow plug shield disposed between said injector and a glow plug proximate to said shield, thereby causing said first quantity of said fuel to ignite on said glow plug after passing through said entry passage,
      (2) directing a flame from combustion of said first quantity of said fuel at a second quantity of said fuel through an exit passage defined in said shield, said second quantity of said fuel directed past said shield and beyond said exit passage, said flame causing said second quantity of said fuel to ignite, combustion of said first and second quantity increasing temperature of said intake charge within said combustion chamber;
      (3) injecting a third quantity of said fuel directly into said combustion chamber near completion of compression of said intake charge when a temperature of said intake charge is at or above an auto-ignition temperature of said fuel.

24. The method of claim 23 wherein said fuel is a gaseous fuel.

25. The method of claim 24 wherein said fuel comprises at least one of methane, ethane, propane, butane and hydrogen.

* * * * *